(12) United States Patent
Blank

(10) Patent No.: US 7,032,817 B2
(45) Date of Patent: Apr. 25, 2006

(54) TRANSACTION CARD WITH SHAPED EDGE

(75) Inventor: Eric Blank, Boston, MA (US)

(73) Assignee: Arthur Blank & Company, Inc., Boston, MA (US)

( * ) Notice: Subject to any disclaimer, the term of this patent is extended or adjusted under 35 U.S.C. 154(b) by 0 days.

(21) Appl. No.: 10/338,812

(22) Filed: Jan. 8, 2003

(65) Prior Publication Data
US 2003/0150919 A1    Aug. 14, 2003

Related U.S. Application Data

(63) Continuation-in-part of application No. 09/602,223, filed on Jun. 23, 2000, now Pat. No. 6,588,658.

(51) Int. Cl.
*G06K 5/00* (2006.01)

(52) U.S. Cl. .................. 235/380; 235/383; 235/487

(58) Field of Classification Search ............. 235/380, 235/381, 375, 486, 383, 487; 283/70, 105
See application file for complete search history.

(56) References Cited

U.S. PATENT DOCUMENTS

| | | |
|---|---|---|
| 2,434,545 A | 1/1948 | Brady, Jr. et al. |
| 2,831,277 A | 4/1958 | Strachan |
| 3,038,597 A | 6/1962 | Brady, Jr. |
| 3,226,862 A | 1/1966 | Gabruk |
| 3,568,829 A | 3/1971 | Brady, Jr. |
| 3,583,317 A | 6/1971 | Gibson |
| 3,622,995 A | 11/1971 | Dilks et al. |
| 3,632,995 A | 1/1972 | Wilson |
| 3,808,718 A | 5/1974 | Christiansen |
| 3,822,492 A | 7/1974 | Crawley |
| 3,896,246 A | 7/1975 | Brady, Jr. |
| 3,914,483 A | 10/1975 | Stipek, Jr. |
| 3,965,598 A | 6/1976 | Avery |
| 4,060,168 A | 11/1977 | Romagnoli |
| 4,066,873 A | 1/1978 | Schatz |
| 4,126,333 A | 11/1978 | Dickinson |
| 4,272,327 A | 6/1981 | Logan |
| 4,359,633 A | 11/1982 | Bianco |
| 4,372,681 A | 2/1983 | Sallenbach |
| RE31,211 E | 4/1983 | Whitehead |
| 4,379,573 A | 4/1983 | Lomeli et al. |
| 4,544,590 A | 10/1985 | Egan |
| 4,620,727 A | 11/1986 | Stockburger et al. |
| 4,627,643 A | 12/1986 | Leonetti et al. |
| 4,643,455 A | 2/1987 | North et al. |
| 4,682,692 A | 7/1987 | Kessler |
| 4,724,166 A | 2/1988 | deBruin |
| 4,726,131 A * | 2/1988 | Cass ........................ 40/638 |
| 4,778,153 A | 10/1988 | Bachman et al. |

(Continued)

FOREIGN PATENT DOCUMENTS

EP    0570317 A1    11/1993

(Continued)

*Primary Examiner*—Ahshik Kim
(74) *Attorney, Agent, or Firm*—Wolf, Greenfield & Sacks, P.C.

(57) ABSTRACT

A transaction card assembly may include a transaction card and an auxiliary portion attached to the transaction card. The transaction card and the auxiliary portion may be formed to have a shaped edge that conforms with a trademark, a representation of a product, or other information printed or otherwise formed on the assembly. The auxiliary portion may be a functional item, such as a shoe horn or a luggage tag.

26 Claims, 2 Drawing Sheets

U.S. PATENT DOCUMENTS

| | | | |
|---|---|---|---|
| 4,815,768 A | 3/1989 | Applebaum et al. | |
| 4,839,507 A | 6/1989 | May | |
| 4,854,610 A | 8/1989 | Kwiatek | |
| 4,872,707 A | 10/1989 | deBruin | |
| 4,944,532 A | 7/1990 | Pollard | |
| 4,957,311 A | 9/1990 | Geisenheimer | |
| 4,958,066 A | 9/1990 | Hedgcoth | |
| 4,972,476 A | 11/1990 | Nathans | |
| 4,978,146 A | 12/1990 | Warther et al. | |
| 5,002,313 A * | 3/1991 | Salvatore | 283/102 |
| 5,019,697 A | 5/1991 | Postman | |
| 5,020,931 A * | 6/1991 | Sloot | 402/79 |
| 5,067,713 A | 11/1991 | Soules et al. | |
| 5,131,516 A | 7/1992 | Clough | |
| 5,173,081 A | 12/1992 | Greig | |
| 5,281,799 A | 1/1994 | McIntire et al. | |
| 5,282,649 A | 2/1994 | Williams et al. | |
| 5,299,834 A | 4/1994 | Kraige | |
| 5,308,120 A | 5/1994 | Thompson | |
| 5,390,794 A | 2/1995 | Vulpitta | |
| 5,427,832 A | 6/1995 | Longtin | |
| 5,438,928 A | 8/1995 | Chatwin et al. | |
| 5,494,544 A | 2/1996 | Hill et al. | |
| 5,495,981 A | 3/1996 | Warther | |
| 5,501,491 A | 3/1996 | Thompson | |
| 5,506,395 A | 4/1996 | Eppley | |
| 5,514,860 A | 5/1996 | Berson | |
| 5,522,623 A | 6/1996 | Soules et al. | |
| 5,531,482 A | 7/1996 | Blank | |
| 5,538,291 A * | 7/1996 | Gustafson | 235/487 |
| 5,594,233 A | 1/1997 | Kenneth et al. | |
| 5,609,253 A | 3/1997 | Goade, Sr. | |
| 5,720,158 A | 2/1998 | Goade, Sr. | |
| 5,740,915 A | 4/1998 | Williams | |
| 5,769,457 A | 6/1998 | Warther | |
| 5,863,076 A * | 1/1999 | Warther | 283/74 |
| 5,868,498 A * | 2/1999 | Martin | 383/11 |
| 5,887,899 A * | 3/1999 | Dobbins | 281/2 |
| 5,918,909 A | 7/1999 | Fiala et al. | |
| 5,921,584 A | 7/1999 | Goade, Sr. | |
| 5,949,058 A | 9/1999 | Kimura | |
| 5,997,042 A | 12/1999 | Blank | |
| 6,036,099 A | 3/2000 | Leighton | |
| 6,039,356 A | 3/2000 | Warther et al. | |
| 6,050,118 A * | 4/2000 | Kito | 70/456 R |
| 6,109,439 A | 8/2000 | Goade, Sr. | |
| 6,173,901 B1 | 1/2001 | McCannel | |
| 6,199,757 B1 | 3/2001 | Kubert | |
| 6,294,237 B1 * | 9/2001 | Popat | 428/40.1 |
| 6,305,716 B1 | 10/2001 | Warther et al. | |
| 6,315,206 B1 | 11/2001 | Hansen et al. | |
| 6,328,340 B1 * | 12/2001 | Fischer | 283/62 |
| 6,328,341 B1 | 12/2001 | Klure | |
| 6,585,845 B1 * | 7/2003 | Peterson | 156/257 |
| 6,887,666 B1 * | 5/2005 | Hager | 235/488 |

FOREIGN PATENT DOCUMENTS

| | | |
|---|---|---|
| FR | 2566564 | 12/1985 |
| GB | 2143204 A | 2/1985 |
| JP | 6048072 | 2/1994 |

* cited by examiner

TRANSACTION CARD WITH SHAPED EDGE

This application is a continuation-in-part of U.S. application Ser. No. 09/602,223, now U.S. Pat. 6,588,658, filed Jun. 23, 2000 which is hereby incorporated by reference in its entirety.

FIELD OF THE INVENTION

This invention relates to transaction cards.

BACKGROUND OF THE INVENTION

Transaction cards, such as credit and debit cards, membership cards, promotional cards, e.g., frequent flyer cards, identification cards and the like, are widely used. Such transaction cards may include a variety of different indicia to identify the card, the individual using the card, a transaction account, such as a credit card account, or other features. The indicia may include a string of alphanumeric characters, a bar code or an encoded magnetic strip attached to the card.

Transaction cards have been produced that include an advertising section attached to the card. For example, a prepaid phone card has been produced such that a rectangular transaction card has an advertising portion attached along a long edge of the transaction card. That is, the transaction card and attached advertising section are produced from a single piece of plastic or paper material with a perforation or other line of weakness positioned between the transaction card and the advertising section. The transaction card may be removed from the advertising section by bending or tearing along the perforation or line of weakness. This type of transaction card is typically made using a relatively thin paper or plastic material and results in the formation of a card that does not substantially meet American National Standards Institute (ANSI) and/or International Standards Organization (ISO) standards for transaction cards.

SUMMARY OF INVENTION

In one aspect of the invention, a transaction card assembly includes a sheet having a transaction card portion and an auxiliary portion. The transaction card portion may be separated from the auxiliary portion by a line of weakness so that the transaction card portion is separable from the auxiliary portion by hand and without the use of tools. The transaction card portion may be usable as a transaction card by an issuee of the card in a transaction, such as a purchase, to gain entry to a facility or locked door, to identify the issuee (such as in the case of grocery store loyalty cards or company identification cards, etc.), to obtain a discount or free item, and so on. At least one of the transaction card portion and the auxiliary portion may have a shaped edge that conforms to at least a portion of a shape of a trademark printed or otherwise carried on the transaction card portion or auxiliary portion. The shaped edge may allow the assembly to be distinctive and stand out from others in a display, particularly where the shaped edge forms a portion of a well known trademark. The shaped edge may therefore enhance the ability of a potential purchaser to identify the transaction card assembly and associate it with a particular source of products. This ease of association may lend to increased sales or other economic activity in connection with the transaction card assemblies.

In one aspect of the invention, the shaped edge may include at least a portion of the line of weakness, or be entirely formed by the line of weakness.

In one aspect of the invention, the trademark may include a logo or text that is printed on the transaction card portion, the auxiliary portion, or may be printed so the trademark extends across the line of weakness.

In one aspect of the invention, the transaction card portion may be one of a gift card, a prepaid phone card, a frequent shopper card, a loyalty card and a membership card and the trademark may be a trademark used by an issuer of the card.

In one aspect of the invention, the trademark may be a common law trademark, a registered trademark or other type of mark.

In one aspect of the invention, the transaction card portion may include one of a barcode and an encoded magnetic strip, e.g., to carry information to identify the issuee of the card like that in a credit card, loyalty card, identification card, etc.

In one aspect of the invention, a transaction card assembly may include a sheet having a transaction card portion and an auxiliary portion. The transaction card portion may be separated from the auxiliary portion by a line of weakness so that the transaction card portion is separable from the auxiliary portion by hand and without the use of tools. The transaction card portion may be usable as a transaction card by an issuee of the card in a transaction, such as a purchase, to gain entry to a facility or locked door, to identify the issuee (such as in the case of grocery store loyalty cards or company identification cards, etc.), to obtain a discount or free item, and so on. At least one of the transaction card portion and the auxiliary portion may have a shaped edge that conforms to at least a portion of a shape of a representation of a product (a good or service) printed or otherwise carried on the transaction card portion or auxiliary portion. The shaped edge may allow the transaction card assembly to stand out and quickly identify the products with which the assembly is associated.

In one aspect of the invention, the product is a product that is offered for sale by an issuer of the transaction card portion. For example, the shaped edge may approximate the shape of a portion of a tire, a donut, a shoe, or any other suitable item.

In one aspect of the invention, the shaped edge may include at least a portion of the line of weakness, or be entirely formed by the line of weakness.

In one aspect of the invention, the represented product may include a logo or other information that is printed on the transaction card portion, the auxiliary portion, or may be printed so the representation extends across the line of weakness.

In one aspect of the invention, the transaction card portion may be one of a gift card, a prepaid phone card, a frequent shopper card, a loyalty card and a membership card.

In one aspect of the invention, the transaction card portion may include one of a barcode and an encoded magnetic strip, e.g., to carry information to identify the issuee of the card like that in a credit card, loyalty card, identification card, etc.

In one aspect of the invention, a transaction card assembly includes a sheet having a transaction card portion and an auxiliary portion. The transaction card portion may be separated from the auxiliary portion by a line of weakness so that the transaction card portion is separable from the auxiliary portion by hand and without the use of tools. The transaction card portion may be usable as a transaction card by an issuee of the card in a transaction, and the auxiliary portion may be specially shaped to function as a shoe horn.

In one aspect of the invention, the auxiliary portion includes a semi-circular shaped portion extending from a handle portion.

In one aspect of the invention, the transaction card portion is a hotel room key.

In one aspect of the invention, a transaction card assembly includes a sheet having a transaction card portion and an auxiliary portion, the transaction card portion separated from the auxiliary portion by a line of weakness so that the transaction card portion is separable from the auxiliary portion by hand and without the use of tools. The transaction card portion may include information formed on the card that identifies an issuee of the transaction card portion and be usable as a transaction card by the issuee of the card. The auxiliary portion may be shaped and arranged to form a luggage tag and include printed information that identifies the issuee of the transaction card.

In an illustrative embodiment of the invention, a transaction card assembly includes a transaction card portion that is configured to meet ANSI and ISO specifications after separation from an auxiliary portion is attached at a line of weakness to the transaction card portion. That is, the transaction card portion may have a suitably smooth edge roughness to meet ANSI and ISO specifications, even at the part of the card along the line of weakness after the auxiliary portion and the card portion are separated.

BRIEF DESCRIPTION OF THE DRAWINGS

Illustrative embodiments of the invention are described below with reference to the following drawings, in which like numerals reference like elements, and wherein.

DETAILED DESCRIPTION

It should be understood that aspects of the invention are described with reference to the figures which show illustrative embodiments of the invention. The illustrative embodiments described below are not intended to show all aspects of the invention, but rather are used to describe a few illustrative embodiments of the invention. Thus, the claimed inventions are not intended to be construed narrowly in view of the illustrative embodiments.

As discussed above, transaction cards are widely used for a variety of different purposes, such as for credit and debit account purchases, tracking member activity (e.g., tracking frequent flyer activity), for gift-certificate purchases, opening hotel room doors, and so on. Vendors issuing transaction cards for tracking member activity typically wish to ensure that users of an account receive additional transaction cards, keytags or other devices or information that are appropriately associated with the transaction card. Vendors may also wish to provide advertising or other promotional information with a transaction card, e.g., to defer some of the cost of issuing the transaction card by having others pay for advertising included with the transaction card. As one example, a vendor may wish to issue a gift card or prepaid telephone card that entitles the bearer to a specified amount of purchase or telephone use credit. Advertising may be provided with the transaction card on a portion attached to the card to promote the vendor's service or other products. As a result, transaction cards are advantageously provided attached to an auxiliary portion that may carry the additional transaction cards, keytags, advertising, promotional information, instructions, etc. that a vendor would like to accompany the transaction card. Together, the transaction card and auxiliary portion form a transaction card assembly.

In accordance with one aspect of the invention, to distinguish their products, i.e., goods or services, offered in connection with a transaction card assembly, an issuer of the transaction card may include a shaped edge on some portion of a transaction card assembly that conforms with a trademark or a representation of products carried on the assembly. For example, a product name or symbol may be printed on the assembly, and at least a portion of the assembly may be shaped to conform with part of the product name or symbol. This may result in the shape of card assembly itself giving a potential customer an impression of the products offered, or a source of the products. This impression may help bring a particular trademark or product to the purchaser's attention, and may induce increased economic activity in connection with the card assemblies. The shaped edge may also allow a customer to more easily select a particular card assembly. For example, a vendor may offer prepaid phone cards having 10, 20 and 60 minutes of telephone time. The numbers 10, 20 and 60 may be printed on the assembly to indicate the amount of minutes, and a portion of the card assembly may be shaped to match a contour of the 10, 20 and 60. This shaped edge may allow a customer to more easily distinguish between the products.

Figure 1:
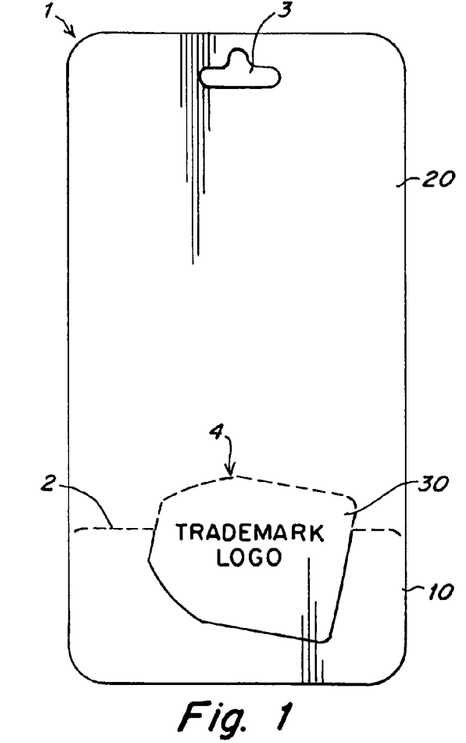
FIG. 1 is a transaction card assembly having a shaped edge conforming to a portion of a trademark in accordance with an embodiment of the invention.
Figure 2:
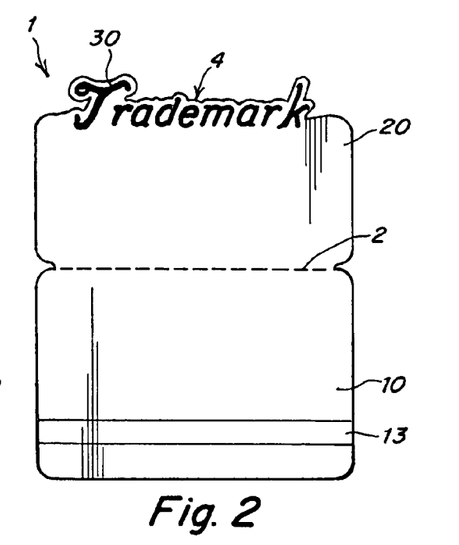
FIG. 2 is a transaction card assembly having a shaped edge conforming to a portion of a trademark in accordance with another embodiment of the invention.

FIG. 1 shows a transaction card assembly in accordance with an illustrative embodiment of the invention. In this illustrative embodiment, the transaction card 10 includes a shaped edge 4 that conforms to a trademark 30 printed or otherwise carried on the transaction card 10. That is, the shaped edge 4 approximates a portion of the trademark 30 and helps to give an impression of the trademark 30. Typically, the shaped edge 4 will be non-linear, and may have a curved or otherwise distinctive appearance as it may attract more attention. In this illustrative embodiment, the shaped edge 4 is formed by the line of weakness 2 (a perforation, scoring or other feature that allows the transaction card 10 to be separated from the auxiliary portion 20), but the shaped edge 4 may be formed at one of the cut edges of the transaction card 10 and/or the auxiliary portion 20. For example, FIG. 2 shows an illustrative embodiment in which the shaped edge 4 is formed at a cut edge of the auxiliary portion 20, e.g., a die cut edge formed when the assembly 1 is cut from a sheet. Of course, it will be understood that the trademark 30 may have any shape, form, color or other feature. In addition, the trademark 30 may include graphic shapes or forms, a logo, text, and/or other information. The trademark may take up all or only part of the transaction card 10 and/or auxiliary portion 20. The trademark need not be registered with a government authority, but instead may be any mark to which the user may be entitled trademark rights under state or other government law.

The transaction card assembly 1 shown in FIGS. 1 and 2 includes a sheet of material from which both the transaction card portion 10 and the auxiliary portion 20 are formed. The transaction card 10 and the auxiliary portion 20 may be formed of any suitable material, such as a plastic or paper sheet material. For example, the transaction card 10 and the auxiliary portion 20 may be stamped or die cut from a same sheet of plastic material. The line of weakness 2, which may include perforations, scoring, or other features, may be formed between the transaction card 10 and the auxiliary portion 20. Using the line of weakness 2, the transaction card 10 and the auxiliary portion 20 may be separated from each other by folding the auxiliary portion 20 toward the transaction card 10 along the line of weakness 2, or by tearing along the line of weakness 2. The line of weakness 2 may be formed to allow separation of the auxiliary portion 20 from the transaction card 10 so that at least the transaction card 10 edge where the auxiliary portion 20 was attached has a smooth edge after separation, e.g., a sufficiently smooth edge to meet ANSI and ISO specifications. One way to accomplish this type of separation is to score the sheet of material at the line of weakness on both sides to a sufficient depth. The line of weakness 2 is not a required feature, since the transaction card 10 and the auxiliary portion 20 may be separated, if desired, by cutting the transaction card 10 and the auxiliary portion 20 apart, e.g., using a scissor, shear or other suitable device or method. If the transaction card 10 is intended to meet ANSI and ISO specifications, at least the transaction card 10 may be made from a sheet of suitable material, e.g., poly vinyl chloride (PVC) or other material (e.g., PET, PETG, ABS or other plastic and/or synthetic materials) having a thickness of 0.030 inches±ten percent. However, ANSI and ISO specifications for transaction cards typically change over time, and therefore the transaction card 10 may be made of any suitable material, have any suitable dimensions or have any other feature to meet with desired ANSI and ISO specifications for transaction cards.

As with any of the embodiments described herein, the transaction card portion 10 may be used, for example, as a credit or debit card, a membership identification card, an account identification card, a gift card, a prepaid telephone card, and so on. The transaction card portion 10 may be formed to fall within the standard CR-80 footprint, e.g., so the card may be used with standard throat-type card readers. In the case where the transaction card portion 10 includes a shaped edge 4 as in FIG. 1, the shaped edge 4 may be arranged so that the trademark or other representation is conformed to, but also so the card may be used in throat-type card readers or other automatic card readers. To operate with a standard throat-type reader, the card portion 10 will typically have to fit within the CR-80 footprint and may require the shaped edge 4 (if it lies along one of the long edges of the card) to be shaped so the card can be fed properly by the reader without cocking or becoming jammed. The auxiliary portion 20 may also be used as, or include an additional transaction card, but may alternately include any printed or otherwise presented material, such as advertising, handwritten or embossed information, a barcode, magnetic strip or other machine readable information, a coupon or other purchase rebate information, a keytag, and so on. The assembly 1 may include a hanger hole 3 from which the assembly 1 may hang on a display peg or any other suitable features.

In an alternative embodiment (and equally applicable to all embodiments herein), the transaction card 10 and the auxiliary portion 20 may be formed separately, and may be formed of different materials. The transaction card 10 and the auxiliary portion 20 may then be connected together, e.g., along mating edges positioned similar to that shown for the line of weakness 2 in FIGS. 1 and 2. The transaction card 10 and the auxiliary portion 20 may be joined together at the edges by any suitable means, such as thermal welding, an adhesive, a mechanical fastener, a coupling device (e.g., a coupling having opposed channels into which the edges of the transaction card 10 and the auxiliary portion 20 are inserted and held by the channels) and so on. In addition, the transaction card 10 and the auxiliary portion 20 need not be joined in an edge-to-edge relationship. Instead, the auxiliary portion 20 may overlap a portion of the transaction card 10 and be joined to the transaction card 10 at the overlap. The auxiliary portion 20 may also be overlapped and attached to the transaction card 10 so that information or other features on the transaction card 10 are obscured from view until the transaction card 10 and auxiliary portion 20 are separated. For example, the transaction card 10 may be a prepaid phone card having a personal identification number (PIN) or other character sequence that is used to obtain prepaid telephone services. The auxiliary portion 20 may be attached to the transaction card 10 so that the PIN or other sequence is obscured from view so that it cannot be viewed (at least without detection) until after the phone card is activated at the time of purchase. In this alternative embodiment, the auxiliary portion 20 may be separated from the transaction card 10 by bending the auxiliary portion 20 relative to the transaction card 10, thereby causing an adhesive used to join the transaction card 10 and the auxiliary portion 20 together to fail. As with the other examples described above, the auxiliary portion 20 may be separated from the transaction card 10 by other means, such as by cutting, applying heat to the joint, and so on.

The transaction card 10 and/or the auxiliary portion 20 may include any printed or embossed matter or otherwise display any suitable information, such as an advertisement, a credit card number, a message, an account number, a PIN number, one or more labels adhered to the transaction card 10 or the auxiliary portion 20 that include information or cover information on the transaction card 10 or the auxiliary portion 20, and so on. The transaction card 10 and/or the auxiliary portion 20 may also include other similar features, such as a clip, pin or other fastener. As one example, the auxiliary portion 20 may be provided with a clip to attach the auxiliary portion 20 to a garment. The auxiliary portion 20 may be printed with information, such as an individual's name and photo identification so that the individual may wear the auxiliary portion 20 as a security badge. The transaction card 10 may be detached from the auxiliary portion 20 and used, for example, as a pass key. Alternately, the transaction card 10 may be removed by security personnel when the individual passes a security checkpoint. Thus, the transaction card 10 in this example may be used as a form of ticket to gain admission to a particular area.

As another example, the transaction card assembly 1 may be used as part of a transaction tracking system. For example, the transaction card 10 may be used as a gift card to purchase items at a retail outlet. Retailers selling the gift card may use the auxiliary portion 20 to advertise the gift card, provide a place for a handwritten message to be placed by the giver of the gift card, and so on.

The transaction card 10 or the auxiliary portion 20 may also include one or more machine readable features either of the same type or of different types, e.g., two magnetic strips, a magnetic strip and a bar code, etc. Further, the machine readable features, like any other information on the transaction card 10 and/or the auxiliary portion 20 may be placed on any suitable side or location of the card 10 or the auxiliary portion 20. For example, the transaction card 10 may include a machine readable feature in the form of a magnetic strip 13, as shown in FIG. 2. The magnetic strip 13 may be encoded with suitable information as is common with credit cards, debit cards and automatic teller machine (ATM) cards. The magnetic strip 13 may be heat laminated to the transaction card 10, e.g., in a way to meet current or future ANSI and ISO standards, or may be positioned on the transaction card in other ways. For example, the magnetic strip 13 may be fixed to the transaction card 10 by an adhesive. Use of a magnetic strip that meets ANSI and ISO specifications may be required for specific applications, such as credit card applications where the magnetic strip may be repeatedly read over its lifetime. However, the magnetic strip may be fixed to the transaction card 10 in a less robust way for less demanding applications, such as where the magnetic strip may be read only once or twice over its lifetime.

The transaction card 10 and/or the auxiliary portion 20 may include other machine readable features, such as bar codes or other passive devices. The transaction card 10 and/or the auxiliary portion 20 may also include more active devices, such as semiconductor devices found in electronic cash cards like that described in U.S. Pat. No. 5,971,282. Thus, the transaction card 10 and/or the auxiliary portion 20 may include any suitable electronic device capable of providing identification information, receiving and processing information or performing other desired transaction functions. The machine readable features may be used to store, obtain, transmit or otherwise handle any type of information, such as text, biometrics information (such as eyescan or fingerprint information) and so on.

Figures 3, 4:
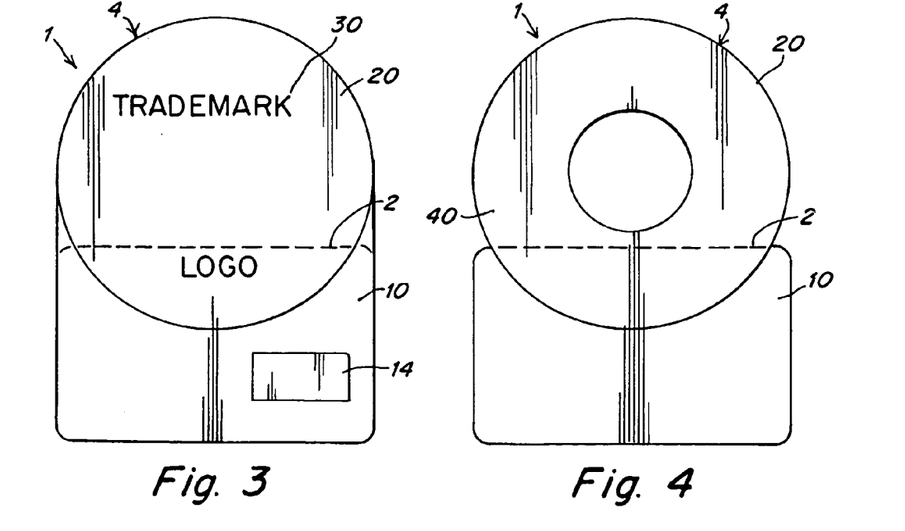
FIG. 3 is a transaction card assembly having a shaped edge conforming to a portion of a trademark in accordance with another embodiment of the invention
FIG. 4 is a transaction card assembly having a shaped edge conforming to a depicted product in accordance with another embodiment of the invention

FIG. 3 shows another illustrative embodiment of the invention. In this embodiment, an auxiliary portion 20 includes a trademark 30 that is printed or otherwise formed and extends across the line of weakness 2 to the transaction card 10. Thus, the trademark 30 or other printed matter is not limited to being placed only on the auxiliary portion or only on the transaction card portion. In addition, although the shaped edge 4 in this embodiment extends only on the auxiliary portion 20, the shaped edge 4 may also extend from the auxiliary portion 20 to the transaction card 30.

In another aspect of the invention, one or more labels 14 may be attached to the transaction card 10 and/or the auxiliary portion 20. A label 14 may be attached so that the label 14 is removable and reusable, e.g., can be removed and adhered again to the transaction card 10 and/or the auxiliary portion 20 or to another surface, so that the label 14 is removable but cannot be reattached to any surface, or so that the label 14 is not removable (without damaging the label 14). The label 14 may include any information, e.g., that is printed on the label 14, and/or the label 14 may obscure information on the transaction card 10 and/or the auxiliary portion 20 from view. For example, the label 14 may obscure a PIN number on the transaction card 10 that is used to obtain prepaid telephone services and not be removable without detection. Thus, the account associated with the transaction card 10 may be activated, e.g., at the time of purchase, and the label 14 removed to reveal the PIN number to the purchaser. The label 14 may also include a machine readable feature, such as a magnetic strip 13, that is adhered to the transaction card 10 and/or the auxiliary portion 20.

In another embodiment, the label 14 may include an alphanumerical string that matches an alphanumerical string encoded in a barcode and/or magnetic strip on the transaction card portion 10. Indicia on the label 14, the magnetic strip and/or the barcode may be unique with respect to transaction card assemblies 1 in a set of assemblies 1. For example, each transaction card assembly 1 may include indicia, such as an account number, that is unique to that transaction card assembly 1. A plurality of transaction card assemblies 1 each having unique indicia may be included in a set of assemblies 1 that are used, for example, as part of a member transaction tracking system, such as a frequent flyer program or grocery store membership program. If the indicia on the label 14 matches indicia on the transaction card 10 (such as the indicia encoded in the barcode and/or the magnetic strip), the label 14 may be removed from the transaction card 10 when the transaction card 10 is placed into service. For example, as part of an issuee registration procedure, an issuee may complete a registration form including the issuee's name, address and other suitable information and place the label 14 containing the unique indicia on the registration form. Thus, the issuee or transaction card 10 issuer may be more easily assured that the proper indicia, such as an account number, included on the label 14 and in the barcode or magnetic strip is included in the registration form. This can ensure that the proper issuee information is associated with the account number included in the transaction card 10.

As another example, the label 14 may include a personal identification number (PIN) that is personal to authorized users of the transaction card 10. Thus, an issuee of the transaction card 10 may remove the label 14 containing a PIN and attach the label 14 to a registration form or other document that is kept separate from the transaction card 10.

FIG. 4 shows another illustrative embodiment in which a representation of a product 40 is formed on the transaction card portion 10 and/or the auxiliary portion 20 and a shaped edge 4 of the auxiliary portion 20 and/or the transaction card portion 10 conforms to at least a portion of the representation. In this illustrative embodiment, the representation of a product 40 has an annular shape and may represent a donut or tire. Thus, for example, the transaction card assembly 1 may be offered by a donut or tire vendor as a gift card or loyalty card. Of course, the representation of a product may take any form, have any suitable appearance, and be arranged in any way on the assembly as described above in connection with FIGS. 1 and 2 as the example shown in FIG. 4 is not intended to limit this aspect of the invention in any way.

Figure 5:
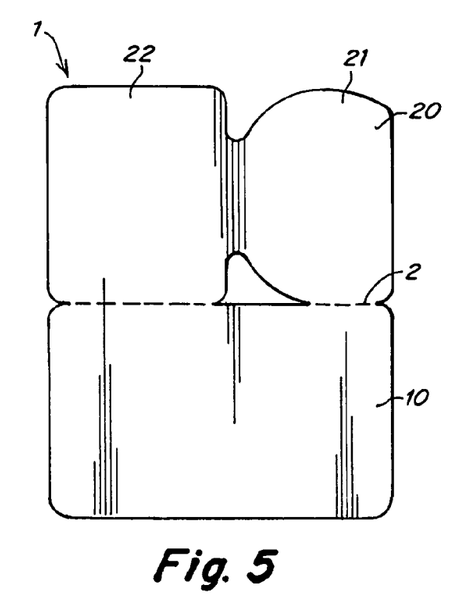
FIG. 5 is a transaction card assembly including a shoe horn portion in accordance with another embodiment of the invention.

FIG. 5 shows another aspect of the invention in which the auxiliary portion 20 is constructed to be functional. In this embodiment, the auxiliary portion 20 is shaped to function as a shoe horn. That is, a semicircular portion 21 extending from a rectangular handle portion 22 is intended to function so that a user can hold the handle portion 22 while inserting the semicircular portion 21 into a heel area of a shoe and use the semicircular portion 21 to help guide one's heel into the shoe. The transaction card portion 10 may be a hotel room key (as are commonly known) or a gift card for a shoe store, for example. The shoe horn may provide an issuee of the card a handy tool and may include advertising, instructions, a discount coupon or other information.

Figure 6:
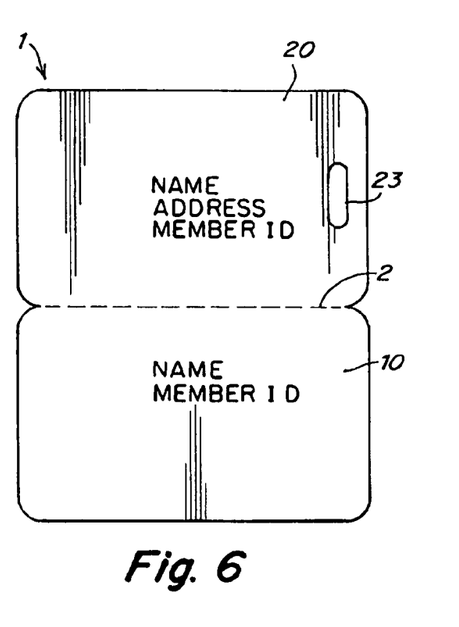
FIG. 6 is a transaction card assembly including a luggage tag portion in accordance with another embodiment of the invention.

FIG. 6 illustrates yet another aspect of the invention in which the auxiliary portion 20 is constructed to be a luggage tag. That is, the auxiliary portion 20 may have a hole 23 that is shaped and positioned at one end of the luggage tag to allow the tag to be tethered to a piece of luggage. The auxiliary portion 20 may also include printed information to identify the issuee, such as a name, address, place of work, membership number or other identifier, etc. The transaction card portion 10 may be a membership card, such as a frequent flyer card, a credit card, etc. By forming the auxiliary portion 20 and the transaction card portion 10 as one separable piece, the risk that the wrong luggage tag (containing personalized information) is not provided with the wrong transaction card (also containing personalized information unique to the issuee). That is, the personalized information may be printed, embossed or otherwise formed on the auxiliary portion 20 and the transaction card portion 10 while they are attached, and possibly even at the same time.

Figure 7:
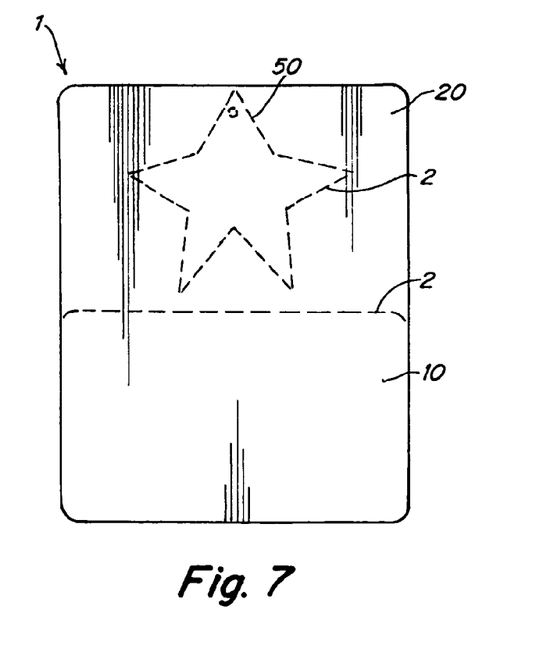
FIG. 7 is a transaction card assembly having a punch-out shape in accordance with another embodiment of the invention.

FIG. 7 shows another aspect of the invention in which the auxiliary portion 20 includes a punch-out element. In this illustrative embodiment, the auxiliary portion 20 includes a star-shaped element 50 that is formed by a line of weakness 2 (perforation, scoring, etc.) that allows the star-shaped element 50 to be removed from the auxiliary portion 20. Of course, the element 50 may have any suitable shape, size, etc., and may be used for any suitable purpose. For example, the element 50 may be a keytag, an ornament, a coupon, a collectible item, and so on. For example, the punch-out element may be used with a gift card configuration and may be removed from the auxiliary member 20 and redeemed to obtain a discount (e.g., 10% off a first purchase made with the gift card).

While the invention has been described in conjunction with specific embodiments thereof, it is evident that many alternatives, modifications, and variations will be apparent to those skilled in the art. Accordingly, embodiments of the invention as set forth herein are intended to be illustrative, not limiting. Various changes may be made without departing from the spirit and scope of the invention.

The invention claimed is:

1. A transaction card assembly comprising:
a sheet having a transaction card portion and an auxiliary portion, the transaction card portion attached to the auxiliary portion by a line of weakness so that the transaction card portion is separable from the auxiliary portion by hand and without the use of tools, the transaction card portion being usable as a transaction card by an issuee of the card in a transaction;
the transaction card portion having a shaped edge at a boundary between the transaction card portion and the auxiliary portion, wherein the shaped edge has at least a non-linear portion that conforms to at least a portion of a shape of a trademark carried on the transaction card portion or auxiliary portion.

2. The assembly of claim 1, wherein the shaped edge includes at least a portion of the line of weakness.

3. The assembly of claim 1, wherein the shaped edge is formed to provide a recognizable impression of the trademark.

4. The assembly of claim 1, wherein the trademark includes a logo or text that is printed on the transaction card portion.

5. The assembly of claim 1, wherein the trademark includes a logo or text that is printed on the auxiliary portion.

6. The assembly of claim 1, wherein the trademark includes a logo or text that is printed so the trademark extends across the line of weakness.

7. The assembly of claim 1, wherein the transaction card portion is a gift card, a prepaid phone card, a frequent shopper card, a loyalty card or a membership card and the trademark is a trademark used by an issuer of the card.

8. The assembly of claim 1, wherein the trademark is a common law trademark.

9. The assembly of claim 1, wherein the transaction card portion includes one of a barcode and an encoded magnetic strip.

10. A set of transaction card assemblies including a plurality of transaction card assemblies according to claim 1, wherein each of the transaction card portions of the plurality of transaction card assemblies includes indicia that uniquely identifies the transaction card portion from all other transaction card portions of the other transaction card assemblies in the set of transaction card assemblies.

11. A transaction card assembly comprising:
a sheet having a transaction card portion and an auxiliary portion, the transaction card portion attached to the auxiliary portion by a line of weakness so that the transaction card portion is separable from the auxiliary portion by hand and without the use of tools, the transaction card portion being usable as a transaction card by an issuee of the card in a transaction;
the transaction card portion having a shaped edge at a boundary between the transaction card portion and the auxiliary portion, wherein the shaped edge has at least a non-linear portion that conforms to at least a portion of a shape of a representation of a product carried on the transaction card portion or auxiliary portion.

12. The assembly of claim 11, wherein the product is a product that is offered for sale by an issuer of the transaction card portion.

13. The assembly of claim 11, wherein the shaped edge includes at least a portion of the line of weakness.

14. The assembly of claim 13, wherein the shaped edge is entirely formed by the line of weakness.

15. The assembly of claim 11, wherein the transaction card portion is a gift card, a prepaid phone card, a frequent shopper card, a loyalty card or a membership card.

16. The assembly of claim 11, wherein the printed representation of the product extends across the line of weakness.

17. A set of transaction card assemblies including a plurality of transaction card assemblies according to claim 11, wherein each of the transaction card portions of the plurality of transaction card assemblies includes indicia that uniquely identifies the transaction card portion from all other transaction card portions of the other transaction card assemblies in the set of transaction card assemblies.

18. A transaction card assembly comprising:
a sheet having a transaction card portion and an auxiliary portion, the transaction card portion separated from the auxiliary portion by a line of weakness so that the transaction card portion is separable from the auxiliary portion by hand and without the use of tools, the transaction card portion being usable as a transaction card by an issuee of the card in a transaction;
the auxiliary portion being specially shaped to function as a shoe horn.

19. The assembly of claim 18, wherein the auxiliary portion includes a semi-circular shaped portion extending from a handle portion.

20. The assembly of claim 19, wherein the transaction card portion includes at least one element usable to unlock a door.

21. The assembly of claim 20, wherein the transaction card portion is a hotel room key.

22. A transaction card assembly comprising:
a sheet having a transaction card portion and an auxiliary portion, the transaction card portion separated from the auxiliary portion by a line of weakness so that the transaction card portion is separable from the auxiliary portion by hand and without the use of tools, the transaction card portion including information formed on the card that identifies an issuee of the transaction card portion and being usable as a transaction card by the issuee of the card in a transaction other than a baggage claim transaction;

the auxiliary portion being shaped and having a hole to form a luggage tag, the auxiliary portion including printed information that identifies the issuee of the transaction card.

23. A transaction card assembly comprising:

a single contiguous sheet having a transaction card portion and an auxiliary portion, the single contiguous sheet having a line of weakness formed in at least part of the sheet so that the transaction card portion is separated from the auxiliary portion by the line of weakness and so that the transaction card portion is separable from the auxiliary portion by hand and without the use of tools, the transaction card portion being usable as a transaction card by an issuee of the card in a transaction;

at least one of the transaction card portion and the auxiliary portion having a shaped edge that conforms to at least a portion of a shape of a trademark carried on the transaction card portion or auxiliary portion.

24. A transaction card assembly comprising:

a single contiguous sheet having a transaction card portion and an auxiliary portion, the single contiguous sheet having a line of weakness formed in at least part of the sheet so that the transaction card portion is separated from the auxiliary portion by the line of weakness and so that the transaction card portion is separable from the auxiliary portion by hand and without the use of tools, the transaction card portion being usable as a transaction card by an issuee of the card in a transaction;

at least one of the transaction card portion and the auxiliary portion having a shaped edge that conforms to at least a portion of a shape of a representation of a product carried on the transaction card portion or auxiliary portion.

25. A transaction card assembly comprising:

a sheet having a transaction card portion and an auxiliary portion, the transaction card portion separated from the auxiliary portion by a line of weakness so that the transaction card portion is separable from the auxiliary portion by hand and without the use of tools, the transaction card portion being fully functional independently of the auxiliary portion as a transaction card by an issuee of the card in a transaction;

wherein the transaction card portion has a shaped edge with a non-linear portion that conforms to at least a portion of a shape of a trademark carried on the transaction card portion or auxiliary portion, and wherein the transaction card portion is arranged for use as a gift card, a prepaid phone card, a frequent shopper card, a loyalty card or a membership card.

26. A transaction card assembly comprising:

a sheet having a transaction card portion and an auxiliary portion, the transaction card portion separated from the auxiliary portion by a line of weakness so that the transaction card portion is separable from the auxiliary portion by hand and without the use of tools, the transaction card portion being fully functional independently of the auxiliary portion as a transaction card by an issuee of the card in a transaction;

wherein the transaction card portion has a shaped edge with a non-linear portion that conforms to at least a portion of a shape of a representation of a product carried on the transaction card portion or auxiliary portion, and wherein the transaction card portion is arranged for use as a gift card, a prepaid phone card, a frequent shopper card, a loyalty card or a membership card.

* * * * *

UNITED STATES PATENT AND TRADEMARK OFFICE
CERTIFICATE OF CORRECTION

| | | |
|---|---|---|
| PATENT NO. | : 7,032,817 B2 | Page 1 of 1 |
| APPLICATION NO. | : 10/338,812 | |
| DATED | : April 25, 2006 | |
| INVENTOR(S) | : Eric Blank et al. | |

It is certified that error appears in the above-identified patent and that said Letters Patent is hereby corrected as shown below:

On the title page, please add inventors --Joseph T. Mandile, Middleboro, MA (US) and David A. Jacobs, Hopkinton, MA (US).--

Signed and Sealed this

Twelfth Day of February, 2008

JON W. DUDAS
*Director of the United States Patent and Trademark Office*